June 7, 1927.
E. ECKL
INSECT DESTROYER
Filed Aug. 9, 1926
1,631,121
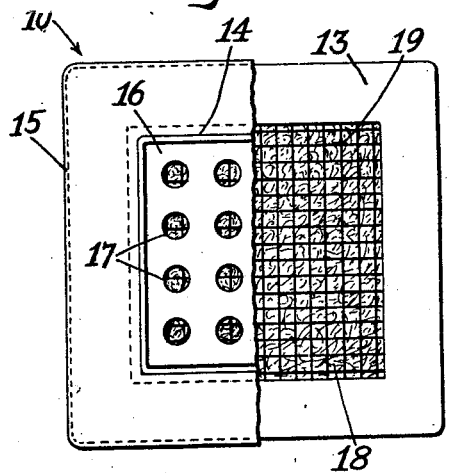
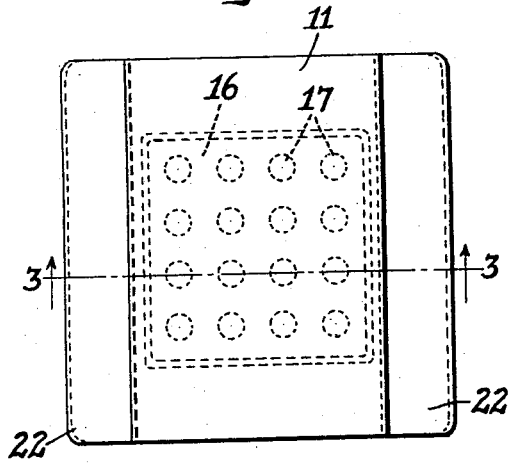
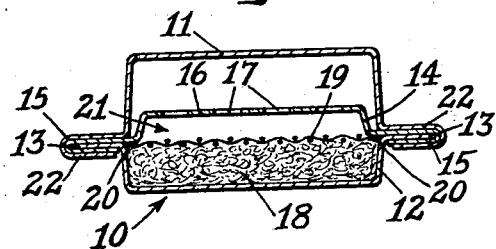
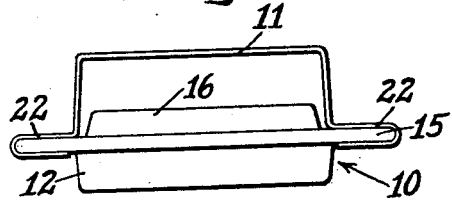
INVENTOR,
Edward Eckl
BY
A. K. Martell
ATTORNEY.

Patented June 7, 1927.

1,631,121

UNITED STATES PATENT OFFICE.

EDWARD ECKL, OF LOS ANGELES, CALIFORNIA.

INSECT DESTROYER.

Application filed August 9, 1926. Serial No. 128,308.

My invention relates to an insect destroyer and more particularly to a device for poisoning ants and other small insects.

The primary object of my invention is to provide a safe and convenient poison container in which the poison is accessible to small insects, particularly to ants, and is not accessible to children, birds or domestic animals, such as fowls, dogs or cats.

A further object is to provide a poison container of the character described which is of such a form and size that it readily may be placed wherever ants or other insect pests are found without occupying an appreciable amount of space or otherwise causing inconvenience.

Other objects and advantages will appear hereinafter and while I show herewith and will describe a preferred form of construction, I desire to be understood that I do not limit myself to such preferred form but that various changes and adaptations may be made therein without departing from the spirit of my invention as hereinafter claimed.

Referring to the drawings which accompany this specification and form a part thereof—

Fig. 1 is a plan view of my poison container, the cover of which is shown partly broken away to disclose underlying parts.

Fig. 2 is a plan view of the container complete with its protecting hood.

Fig. 3 is a sectional view of the complete container, taken on line 3—3 of Fig. 2.

Fig. 4 is an end view of the complete container shown in Fig. 2.

The container consists essentially of a permanently sealed shallow casing 10 with a hood 11, open at each end, clamped rigidly thereon, the whole being square in form and preferably about one and a half inches in size. The parts are made of sheet metal, stamped to form and size, and comprise a shallow pan 12 with a marginal flange 13 and a cover 14 so much larger than the pan that its edges extend over flange 13 and may be bent there-around and thereunder, as shown at 15 in Fig. 3, thus clamping pan and cover permanently together. The cover has a raised or offset central portion 16 with perforations 17, said raised portion being somewhat smaller than the pan 12.

Before the pan and cover are assembled the former is filled with saw dust and cotton 18 or other absorbent material, which is saturated with a poisoned syrup or paste especially prepared for such use. A sheet of woven wire 19 is then placed upon the absorbent material so that the projecting shoulder 20 of the cover engages the margin thereof and holds it away from the perforated portion 16 of the cover. A shallow space 21 is thus formed between the poisoned material and that part of the cover.

The hood 11 is made of a straight piece of sheet metal bent to form offset side flanges 22 which are folded around the side edges of the casing over cover folds 15 and are soldered or riveted thereto so as to guard against the possibility of its becoming detached from the casing. This hood not only guards against the accidental poisoning of children, birds and domestic animals but protects the poison from being washed out of the container by water which may happen to fall upon it.

The poison container unit thus formed may be placed on floors and shelves in kitchens, cupboards and closets or may be thrown on the ground wherever ants or other insect pests are disposed to gather. The insects attracted by the poisoned syrup or sweetened paste, run under the hood at the open ends thereof and crawl through or reach down through the perforations 17 in cover 14 to get at it. The syrup or paste is so prepared that it remains in a moist and therefore an effective condition for a considerable period. The containers are not intended to be refilled or renewed in any way so that it is not necesary to keep dangerous poisons on hand which may cause accidental poisoning.

Having thus illustrated and described my invention, I claim:

1. An insect destroyer comprising a metal casing filled with poison; a perforated cover forming a part of said casing, and a protecting-hood, fixed on said casing over said perforated cover in spaced relation thereto, said hood having openings to permit the entrance of insects between said hood and said cover.

2. An insect destroyer for poisoning ants and other small insects, comprising a shallow pan filled with absorbent material which is saturated with poisoned paste; a perforated cover permanently fixed on said pan so as to enclose said absorbent material, and a protecting hood fixed on said pan over said cover in spaced relation to the latter, said hood being open at its ends to permit the entrance of insects between said hood and said perforated cover.

3. An insect destroyer for poisoning ants and other small insects, comprising a shallow pan filled with absorbent material which is saturated with poisoned paste; a retaining sheet of woven wire placed over said absorbent material; a perforated cover fixed on said shallow pan so as to enclose said absorbent material and said retaining sheet and to hold the latter in spaced relation to the perforations therein, and a protecting hood fixed on said pan over said cover, in spaced relation to the latter, said hood being open at its ends to permit the entrance of insects between said hood and said cover.

4. An insect destroyer for poisoning ants and other small insects, comprising a shallow pan filled with absorbent material which is saturated with poisoned paste; a perforated cover fixed on said pan so as to enclose said absorbent material; a woven wire sheet fixed within said pan so as to hold said absorbent material in spaced relation to the perforations in said cover, and a protecting hood fixed on said pan and cover, over the latter and in spaced relation thereto, said hood being open at its ends to permit the entrance of insects between said cover and said hood.

EDWARD ECKL.